United States Patent
Slocum et al.

(10) Patent No.: US 12,494,206 B2
(45) Date of Patent: Dec. 9, 2025

(54) SPEAKER VERIFICATION WITH MULTITASK SPEECH MODELS

(71) Applicant: Google LLC, Mountain View, CA (US)

(72) Inventors: Alanna Foster Slocum, San Francisco, CA (US); Yiling Huang, Edgewater, NJ (US); Shelly Bensal, San Francisco, CA (US); Quan Wang, Hoboken, NJ (US)

(73) Assignee: Google LLC, Mountain View, CA (US)

( * ) Notice: Subject to any disclaimer, the term of this patent is extended or adjusted under 35 U.S.C. 154(b) by 309 days.

(21) Appl. No.: 18/167,815

(22) Filed: Feb. 10, 2023

(65) Prior Publication Data

US 2023/0260521 A1  Aug. 17, 2023

Related U.S. Application Data

(60) Provisional application No. 63/268,033, filed on Feb. 15, 2022.

(51) Int. Cl.
G10L 17/18 (2013.01)
G10L 17/04 (2013.01)
G10L 17/06 (2013.01)

(52) U.S. Cl.
CPC ............ G10L 17/18 (2013.01); G10L 17/04 (2013.01); G10L 17/06 (2013.01)

(58) Field of Classification Search
CPC ......... G10L 17/18; G10L 17/04; G10L 17/06; G10L 25/51; G10L 25/30; G10L 25/78
See application file for complete search history.

(56) References Cited

U.S. PATENT DOCUMENTS

| 9,865,253 B1* | 1/2018 | De Leon ................. G10L 25/90 |
| 2004/0041902 A1* | 3/2004 | Washington ........... H04N 7/142 |
| | | 348/E7.079 |
| 2020/0286491 A1* | 9/2020 | Moon ..................... G10L 17/06 |
| 2022/0215832 A1* | 7/2022 | Ren .......................... G10L 15/16 |

OTHER PUBLICATIONS

Li, Jiakang, Meng Sun, and Xiongwei Zhang. "Multi-task learning of deep neural networks for joint automatic speaker verification and spoofing detection." 2019 Asia-Pacific Signal and Information Processing Association Annual Summit and Conference (APSIPA ASC). IEEE, 2019. (Year: 2019).*

(Continued)

*Primary Examiner* — Athar N Pasha
(74) *Attorney, Agent, or Firm* — Honigman LLP; Brett A. Krueger; Grant Griffith

(57) ABSTRACT

A method includes obtaining a speaker identification (SID) model trained to predict speaker embeddings from utterances spoken by different speakers, the SID model includes a trained audio encoder and a trained SID head. The method also includes receiving a plurality of synthetic speech detection (SSD) training utterances that include a set of human-originated speech samples and a set of synthetic speech samples. The method also includes training, using the trained audio encoder, a SSD head on the SSD training utterances to learn to detect the presence of synthetic speech in audio encodings encoded by the trained audio encoder. The operations also include providing, for execution on a computing device, a multitask neural network model for performing both SID tasks and SSD tasks on input audio data in parallel.

26 Claims, 5 Drawing Sheets

(56) References Cited

OTHER PUBLICATIONS

WIPO. International Search Report and Written Opinion, relating to application No. PCT/US2023/062446 dated Jun. 1, 2023.
Li Jiakang et al: "Multi-task learning of deep neural networks for joint automatic speaker verification and spoofing detection", 2019 Asia-Pacific Signal and Information Processing Association Annual Summit and Conference (APSIPA ASC), IEEE, Nov. 18, 2019 (Nov. 18, 2019), pp. 1517-1522, XP033733199, DOI: 10.1109/APSIPAASC47483.2019.9023289 [retrieved on Mar. 2, 2020] abstract; figures 1-2 p. 1517-p. 1519.
Mohammad Adiban et al: "Replay Spoofing Countermeasure Using Autoencoder and Siamese Network on ASVspoof 2019 Challenge", Arxiv.Org, Cornell University Library, 201 Olin Library Cornell University Ithaca, NY 14853, Oct. 29, 2019 (Oct. 29, 2019), XP081522640, abstract; figures 1-5 pp. 1-5 pp. 9-10.
You Zhang et al: "A New Fusion Strategy for Spoofing Aware Speaker Verification", Arxiv.Org, Cornell University Library, 201 Olin Library Cornell University Ithaca, NY 14853, Feb. 10, 2022 (Feb. 10, 2022), XP091158921, abstract; figures 1-3 pp. 1-2.
Momina Masood et al: "Deepfakes Generation and Detection: State-of-the-art, open challenges, countermeasures, and way forward", Arxiv.Org, Cornell University Library, 201 Olin Library Cornell University Ithaca, NY 14853, Feb. 25, 2021 (Feb. 25, 2021), XP091086852, abstract; figure 1 pp. 35-38.
Zhao et al. Dec. 6, 2020 "Multi-task Learning Based Spoofing-Robust Automatic Speaker Verification System".
Zhong et al. Jul. 23, 2021 "Text-independent Speaker Recognition Based on Adaptive Course Learning Loss and Deep Residual Network".

\* cited by examiner

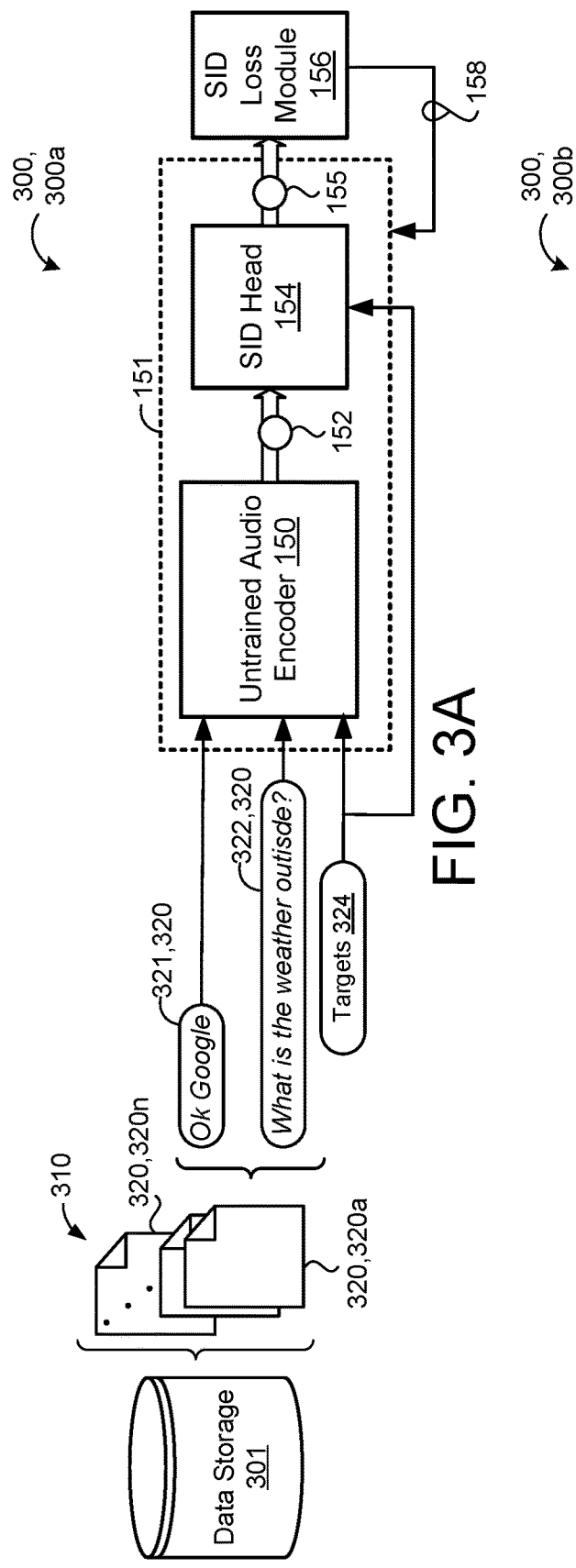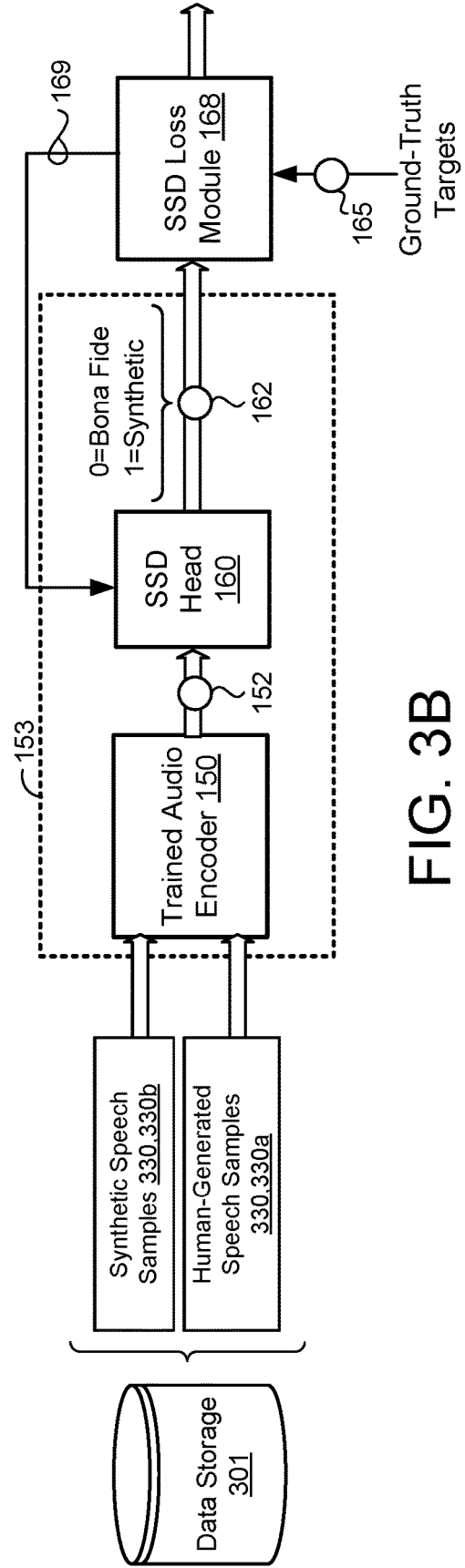

SPEAKER VERIFICATION WITH MULTITASK SPEECH MODELS

CROSS-REFERENCE TO RELATED APPLICATIONS

This U.S. Patent Application claims priority under 35 U.S.C. § 119 (e) to U.S. Provisional Application 63/268,033, filed on Feb. 15, 2022. The disclosure of this prior application is considered part of the disclosure of this application and is hereby incorporated herein by reference in its entirety.

TECHNICAL FIELD

This disclosure relates to automatic speaker verification using multitask speech models.

BACKGROUND

In a speech-enabled environment, such as a home or automobile, a user may access information and/or control various functions using voice input. The information and/or functions may be personalized for a given user. It may therefore be advantageous to identify a given speaker prior to allowing the user access to virtual assistants and telephone voice interfaces. Speaker identification (e.g., speaker verification and voice authentication) provides an easy way for an enrolled user of a user device to gain access to the user device. Speaker identification allows the enrolled user to unlock and access the user's device by speaking an utterance without requiring the enrolled user to manually enter (e.g., via typing or speaking) a passcode to gain access to the user device. Speaker verification also allows a digital assistant to identify enrolled users from spoken utterances without requiring the users to provide authorization credentials. In some instances, a would-be attacker uses speech synthesis algorithms to create synthesized speech in a voice of the enrolled user to fool a speaker identification system into authenticating the synthesized speech to gain access to the user's device or invoke the digital assistant. In additional instances, would-be attackers may also record audio of enrolled user speaking a verification phrase and then replay the recorded audio to gain access to the user's device. Consequently, a system that receives utterances within the environment must have some way of discerning between an utterance of human speech directed at the system and an utterance of synthesized speech.

SUMMARY

One aspect of the disclosure provides a computer-implemented method that, when executed on data processing hardware, causes the data processing hardware to perform operations. The operations include obtaining a speaker identification (SID) model trained to predict speaker embeddings from utterances spoken by different speakers. The SID model includes a trained audio encoder and a trained SID head. The operations also include receiving a plurality of synthetic speech detection (SSD) training utterances that include a set of human-originated speech samples and a set of synthetic speech samples. The operations also include training, using the trained audio encoder, a SSD head on the SSD training utterances to learn to detect the presence of synthetic speech in audio encodings encoded by the trained audio encoder, wherein the SSD head is overlain on the trained audio encoder. The operations also include providing, for execution on a computing device, a multitask neural network model for performing both SID tasks and SSD tasks on input audio data in parallel. Here, the multi-task neural network model includes the trained audio encoder, the trained SID head overlain on the trained audio encoder, and the trained SSD head overlain on the trained audio encoder.

Implementations of the disclosure may include one or more of the following optional features. In some implementations, the SID model is trained on a plurality of SID training data sets that each include a plurality of SID training utterances spoken by M different speakers. Here, one or more of the SID training utterances spoken by a particular speaker may be paired with a corresponding target speaker embedding for training the audio encoder and the SID head to learn how to predict a corresponding speaker embedding for the particular speaker. Moreover, in these implementations, the plurality of SID training utterances of one or more of the SID training sets may include N utterances spoken per speaker among the M different speakers. Optionally, the plurality of SID training utterances of each SID training data set may include human-generated non-synthetic speech.

In some examples, the number of speech samples in the set of human-originated speech samples is greater than the number of speech samples in the set of synthetic speech samples. In additional examples, parameters/weights of the trained audio encoder are frozen while training the SSD head on the SSD training utterances. The audio encoder may include a multi-head attention model architecture. For instance, the multi-head attention model architecture may incorporate a stack of Conformer blocks or Transformer blocks. The SSD head may include one or more fully-connected layers.

In some implementations, the multitask neural network model is configured to perform the SID tasks and the SSD tasks on the input audio data in parallel by: receiving, as input to the trained audio encoder, the input audio data; generating, as output from the trained audio encoder, shared audio encodings that encodes the input audio data; providing, as input to the trained SID head and the SSD head, the shared audio encodings generated as output from the trained audio encoder; generating, as output from the trained SID head, an evaluation speaker embedding representing characteristics of a voice of the utterance characterized by the input audio data; and generating, as output from the trained SSD head, a SSD classification score indicating whether the utterance characterized by the input audio data comprises human-generated bona fide speech or synthetic speech. The audio input data characterizes an utterance captured by an array of one or more microphones. In these implementations, the multitask neural network model may be configured to authorize access to one or more resources when the evaluation speaker embedding matches a reference speaker embedding associated with an enrolled user authorized to access the resources and the SSD classification score generated as output from the trained SSD head indicates the utterance characterized by the input audio data comprises human-generated bona fide speech. Additionally or alternatively, in these implementations, the multitask neural network model may be configured to restrict access to one or more resources when at least one of the evaluation speaker embedding does not match any reference speaker embeddings associated with enrolled users authorized to access the resources, or the SSD classification score generated as output from the trained SSD head indicates the utterance characterized by the input audio data comprises synthetic speech.

Another aspect of the disclosure provides a system including data processing hardware and memory hardware in communication with the data processing hardware and storing instructions executable on the data processing hardware that cause the data processing hardware to perform operations. The operations include obtaining a speaker identification (SID) model trained to predict speaker embeddings from utterances spoken by different speakers. The SID model includes a trained audio encoder and a trained SID head. The operations also include receiving a plurality of synthetic speech detection (SSD) training utterances that include a set of human-originated speech samples and a set of synthetic speech samples. The operations also include training, using the trained audio encoder, a SSD head on the SSD training utterances to learn to detect the presence of synthetic speech in audio encodings encoded by the trained audio encoder, wherein the SSD head is overlain on the trained audio encoder. The operations also include providing, for execution on a computing device, a multitask neural network model for performing both SID tasks and SSD tasks on input audio data in parallel. Here, the multi-task neural network model includes the trained audio encoder, the trained SID head overlain on the trained audio encoder, and the trained SSD head overlain on the trained audio encoder.

This aspect of the disclosure may include one or more of the following optional features. In some implementations, the SID model is trained on a plurality of SID training data sets that each include a plurality of SID training utterances spoken by M different speakers. Here, one or more of the SID training utterances spoken by a particular speaker may be paired with a corresponding target speaker embedding for training the audio encoder and the SID head to learn how to predict a corresponding speaker embedding for the particular speaker. Moreover, in these implementations, the plurality of SID training utterances of one or more of the SID training sets may include N utterances spoken per speaker among the M different speakers. Optionally, the plurality of SID training utterances of each SID training data set may include human-generated non-synthetic speech.

In some examples, the number of speech samples in the set of human-originated speech samples is greater than the number of speech samples in the set of synthetic speech samples. In additional examples, parameters/weights of the trained audio encoder are frozen while training the SSD head on the SSD training utterances. The audio encoder may include a multi-head attention model architecture. For instance, the multi-head attention model architecture may incorporate a stack of Conformer blocks or Transformer blocks. The SSD head may include one or more fully-connected layers.

In some implementations, the multitask neural network model is configured to perform the SID tasks and the SSD tasks on the input audio data in parallel by: receiving, as input to the trained audio encoder, the input audio data; generating, as output from the trained audio encoder, shared audio encodings that encodes the input audio data; providing, as input to the trained SID head and the SSD head, the shared audio encodings generated as output from the trained audio encoder; generating, as output from the trained SID head, an evaluation speaker embedding representing characteristics of a voice of the utterance characterized by the input audio data; and generating, as output from the trained SSD head, a SSD classification score indicating whether the utterance characterized by the input audio data comprises human-generated bona fide speech or synthetic speech. The audio input data characterizes an utterance captured by an array of one or more microphones. In these implementations, the multitask neural network model may be configured to authorize access to one or more resources when the evaluation speaker embedding matches a reference speaker embedding associated with an enrolled user authorized to access the resources and the SSD classification score generated as output from the trained SSD head indicates the utterance characterized by the input audio data comprises human-generated bona fide speech. Additionally or alternatively, in these implementations, the multitask neural network model may be configured to restrict access to one or more resources when at least one of the evaluation speaker embedding does not match any reference speaker embeddings associated with enrolled users authorized to access the resources, or the SSD classification score generated as output from the trained SSD head indicates the utterance characterized by the input audio data comprises synthetic speech.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3A is a schematic view of a first training stage where an untrained audio encoder and a speaker identification (SID) head are trained on a SID task to learn how to predict speaker embeddings/representations from input audio.

FIG. 3B is a schematic view of a second training stage that trains a synthetic speech detection (SSD) head to learn how to predict whether input audio corresponds to human-generated bona fide speech or synthetic/synthesized speech.

Like reference symbols in the various drawings indicate like elements.

DETAILED DESCRIPTION

Figure 1:
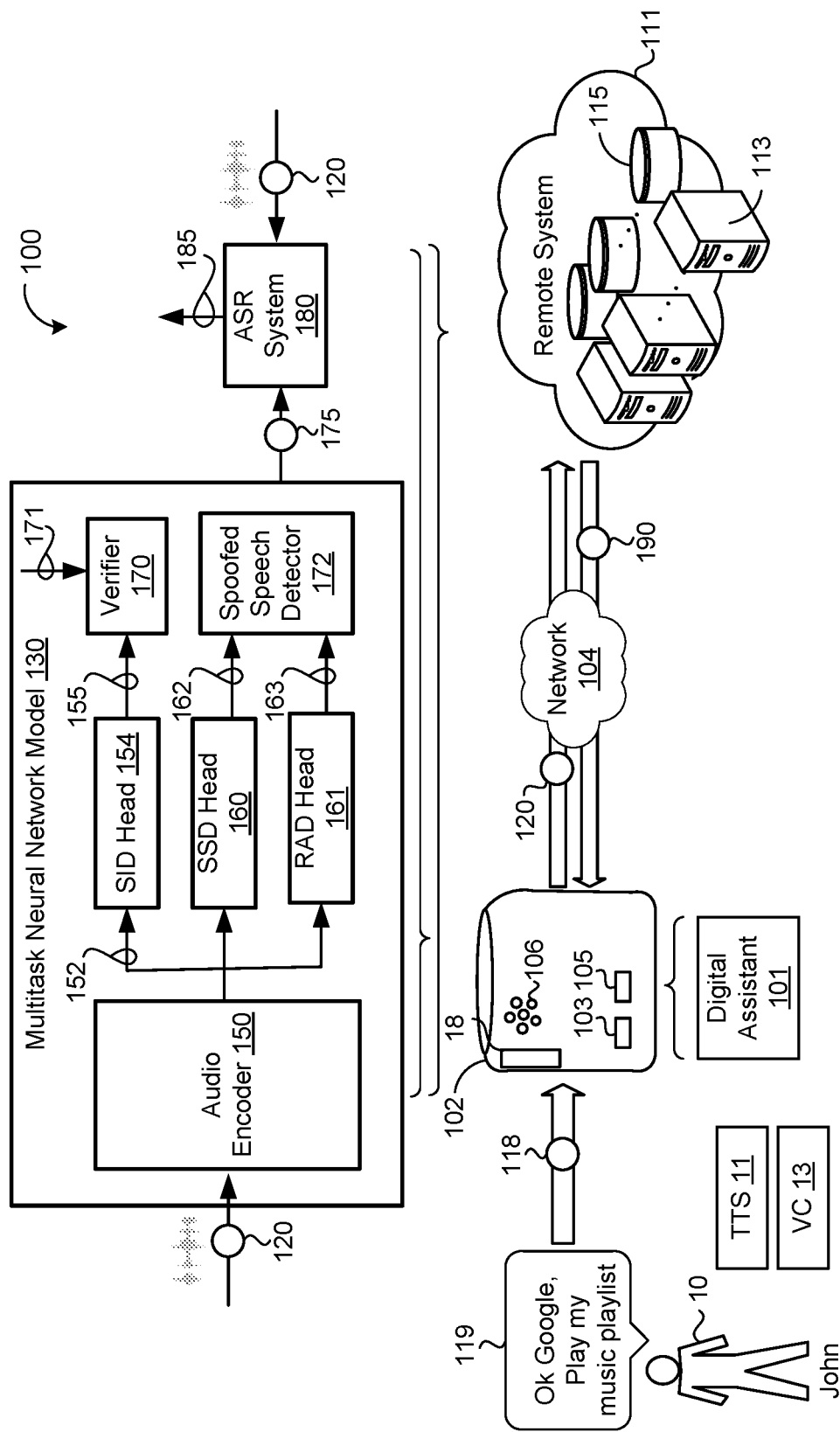
FIG. 1 is a schematic view of an example speech environment having a speaker identification and synthetic speech detection system for identifying a speaker.

In a speech-enabled environment, such as a home, automobile, workplace, or school, a user may speak a query or command and a digital assistant may answer the query and/or cause the command to be performed. Such a speech-enabled environment may be implemented using a network of connected microphone devices distributed through various rooms or areas of the environment. Through the network of microphones, a user can query the digital assistant through a spoken utterance without having to have a computer or other interface in front of them. In some instances, the speech-enabled environment is associated with multiple enrolled users, e.g., people who live in a household. These instances may apply when a single device is shared by multiple users such as a smart phone, smart speaker, smart display, tablet device, smart television, smart appliance, vehicle infotainment system, etc. As such, it is desirable to determine an identity of a particular user that is speaking the query. The process of determining the identities of particular speakers/users may be referred to as speaker verification, speaker recognition, speaker identification, or voice recognition.

Speaker verification/identification may allow a user to issue queries that act on behalf of the particular user and/or trigger personalized responses in multi-user environments. Speaker verification/identification (e.g., voice authentication) provides an easy way for a user of a user device to gain access to the user device. For instance, a user may unlock and access the user device by speaking an utterance without requiring the user to manually enter (e.g., via typing or speaking) a passcode to gain access to the user device.

In some scenarios, a user queries the digital assistant that relates to personal information of the user and/or requires access to a resource from a set of personal resources associated with the user. For instance, a particular user (e.g., one who is enrolled with the digital assistant) might ask the digital assistant "when is my meeting with Matt" or query the digital assistant "play my music playlist". Here, the user may be one of one or more multiple enrolled users who each have permission to access their own respective set of personal resources (e.g., calendar, music player, email, messaging, contact list, etc.) and are restricted from accessing the personal resources of the other enrolled users. For instance, if John is an enrolled user of the digital assistant, the digital assistant would need to discern whether John spoke the utterance "when is my meeting with Matt" in order to access John's appropriate enrolled user calendar to determine when a meeting is scheduled with Matt and respond with meeting details for the scheduled meeting with Matt. Similarly, the digital assistant would need to discern if John spoke the utterance "play my music playlist" in order to access a music player and ultimately audibly output tracks from John's music playlist.

To determine which user is speaking in a multiuser, speech-enabled environment, speech-enabled systems may include speaker identification systems (e.g., speaker verification systems or voice authentication systems). An automatic speaker verification (ASV) system may employ a speaker identification (SID) model trained to extract an evaluation vector (e.g., speaker embedding) from audio data corresponding an utterance spoken by a particular user, whereby the extracted evaluation vector represents voice characteristics of the particular user. The evaluation vector may include a d-vector. The SID model may be a neural network model trained under machine or human supervision to output d-vectors. To resolve the identity of the particular user, a comparer determines whether the evaluation vector matches any reference vectors for enrolled and/or authorized users of the user device. Here, each reference vector may correspond to a voiceprint or unique identifier representing characteristics of the voice of the respective enrolled/authorized user. Each enrolled and/or authorized user may speak multiple enrollment utterances, and for each enrollment phrase, the SID model may generate a corresponding reference d-vector that may be combined, e.g., averaged or otherwise accumulated, to form the respective reference d-vector for the enrolled/authorized user.

With the advent of synthetic media (e.g., "deepfakes"), it is critically important for these systems to accurately determine when a speech utterance includes synthetic speech (i.e., computer-generated audio output that resembles human speech). For example, state of the art text-to-speech (TTS) and voice conversion (VC) systems can now closely mimic human speakers, which provide avenues to attack and deceive ASV systems. As such, the state-of-the art TTS and VC systems could be used to generate a synthesized/synthetic speech representation in the voice of an authorized/enrolled user to spoof the SID model into verifying that the synthesized speech representation was spoken by the authorized/enrolled user. As used herein, the terms "synthesized speech," "synthetic speech," "synthetic utterance", and "synthesized utterance" are used interchangeably. Imposters may also play back audio of an enrolled user's prerecorded voice to spoof the ASV system for gaining unauthorized access to a locked user device of the enrolled user and/or resources associated with the enrolled user. As a result, a microphone of the user device may capture the synthesized speech or played back audio of the enrolled user's prerecorded voice and the ASV system may extract an evaluation vector that matches a reference vector for the enrolled user, thereby spoofing the ASV system and permitting the imposter to gain unauthorized access to the user device.

To detect these spoofing attempts, ASV systems may include one or more countermeasure systems for synthetic speech detection (SSD) and or replay attack detection (RAD). As SID models are typically neural-network based, conventional spoofing countermeasure systems for SSD and RAD are also typically based on neural-network models trained via machine learning techniques. As such, employing additional countermeasure systems in conjunction with the SID model can significantly increase computational/storage requirements due to the need of running multiple separate neural network models in parallel, i.e., a separate neural network model for performing each of SID, SSD, and RAD on an input audio signal. As the primary use cases for ASV systems are for authenticating users "in real time" to invoke virtual assistants and/or gain access to telephone voice interfaces, minimizing latency is critical to ensuring a positive user experience. Moreover, since deployment of ASV systems usually occurs on resource-constrained systems (e.g., smart phones), minimizing computational and storage resource usage is vital.

Machine learning (ML) algorithms such as neural networks have primarily driven the surge of ASV systems and other speech-enabled technologies. However, these algorithms conventionally require vast amounts of training samples such that the primary bottleneck in training accurate models frequently rests on the lack of sufficiently large and high-quality datasets. For example, large datasets that include human-originated speech are readily available, but similar datasets that instead include synthetic speech are not. Thus, training a model that can accurately determine synthetic speech without conventional training sets poses a significant problem for the development of synthetic speech detection systems.

Implementations herein are directed toward a multitask neural network model that is capable of performing both speaker identification and synthetic speech detection tasks concurrently without the need of employing separate neural network models for performing the SID and SSD tasks. In some implementations, the multitask neural network model performs replay attack detection (RAD) in addition to or in lieu of the SSD task. Notably, the multitask neural network model includes an audio encoder that receives, as input, an input audio signal characterizing an utterance and generates, as output, a shared output embedding for use by a SID head and at least one of a SSD head or a RAD head. Here, each of the SID, SSD, and RAD heads may be overlain on top of the audio encoder and configured to compute an output associated with a respective one of the SID, SSD, RAD tasks. For instance, the SID head may include a fully connected network that receives the shared output embedding generated by the audio encoder and computes a speaker embedding that characterizes voice characteristics of a speaker of the utterance. As such, the audio encoder and the SID head may collectively provide a SID model. The SSD head may include a fully connected network that also receives the same shared output embedding generated by the audio encoder but instead computes a synthetic speech score indicating whether the input audio signal corresponds bona fide speech (e.g., non-synthetic/real speech/human speech) or synthetic speech. As such, the audio encoder and the SSD head may collectively provide a SSD model. If applicable, the RAD head may include a fully connected network that also receives the same shared output embedding generated by the audio encoder and computes a RAD score indicating whether the input audio signal corresponds to prerecorded speech played back from an audio output device or non-recorded speech audibly spoken by a human. As such, the audio encoder and the SSD head may collective provide a RAD model.

Described in greater detail below, the audio encoder and the SID head may be initially trained on SID training utterances spoken by different speakers to learn how to predict speaker embeddings for input audio data. Thereafter, the trained audio encoder may be used to train the SSD head and/or the RAD head to learn how to predict the aforementioned synthetic speech and/or RAD scores. Initial training process may first train the multitask neural network model on the SID task to teach the multitask neural network model to learn to produce speaker embeddings from SID training utterances spoken by different speakers.

Referring to FIG. 1, in some implementations, an example system 100 includes a user device 102 associated with one or more users 10 and in communication with a remote system 111 via a network 104. The user device 102 may correspond to a computing device, such as a mobile phone, computer (laptop or desktop), tablet, smart speaker/display, smart appliance, smart headphones, wearable, vehicle infotainment system, etc., and is equipped with data processing hardware 103 and memory hardware 107. The user device 102 includes or is in communication with one or more microphones 106 for capturing utterances from the respective user 10. The remote system 111 may be a single computer, multiple computers, or a distributed system (e.g., a cloud environment) having scalable/elastic computing resources 113 (e.g., data processing hardware) and/or storage resources 115 (e.g., memory hardware).

The user device 102 may include hotword detector (not shown) configured to detect the presence of a hotword in streaming audio 118 without performing semantic analysis or speech recognition processing on the streaming audio 118. The user device 102 may include an acoustic feature extractor (not shown) which may be implemented as part of the hotword detector or as a separate component for extracting audio data 120 from utterances 119. For instance, referring to FIG. 1, the acoustic feature extractor may receive streaming audio 118 captured by the one or more microphones 106 of the user device 102 that corresponds to an utterance 119 spoken by the user 10 and extract the audio data 120. The audio data 120 may include acoustic features such as Mel-frequency cepstrum coefficients (MFCCs) or filter bank energies computed over windows of an audio signal. In the example shown, the utterance 119 spoken by the user 10 includes "Ok Google, Play my music playlist".

The hotword detector may receive the audio data 120 to determine whether the utterance 119 includes a particular hotword (e.g., Ok Google) spoken by the user 10. That is, the hotword detector 110 may be trained to detect the presence of the hotword (e.g., Ok Google) or one or more variants of the hotword (e.g., Hey Google) in the audio data 120 to cause the user device 102 to wake-up from a sleep state or hibernation state and trigger an automated speech recognition (ASR) system 180 to perform speech recognition on the hotword and/or one or more other terms that follow the hotword, e.g., a voice query that follows the hotword and specified an action to perform. In the example shown, the query following the hotword in the utterance 119 captured in the streaming audio includes "Play my music playlist" that specifies an action for the digital assistant to access a music playlist associated with a particular user (e.g., John) 10 and provide a response 190 including an audio track from John's music playlist for the user device 102 (and/or one or more designated audio output devices) to playback for audible output from a speaker.

The system 100 includes a multitask neural network model 130 that is configured to process the audio data 120 to determine an identity of the user 10 that is speaking the utterance 119 and to determine whether the audio data 120 includes spoofed speech. As used herein, the multitask neural network model 130 may include the audio data 120 includes spoofed speech by detecting that the audio data 120 includes synthetic speech and/or optionally detecting that the audio data 120 includes prerecorded speech played back from an audio output device. Advantageously, the multitask neural network model 130 includes a shared audio encoder 150 that receives the audio data 120 as input, and generates, as output, audio encodings 152 corresponding to a hidden feature representation of the audio data 120 encoded by the audio encoder 150. Each audio encoding 152 output from the audio encoder 150 may be input to respective ones of a SID head 154, a SSD head 160, and a RAD head 161 that branch from the audio encoder 150. Accordingly, the audio encoder 150 may serve as a "body" of the multitask neural network model 130 where the audio encoder 150 and the SID head 154 form a SID branch corresponding to a SID model 151 (FIG. 3A), the audio encoder 150 and the SSD head 160 form a SSD branch corresponding to a SSD model 153 (FIG. 3B), and the audio encoder 150 and the RAD head 161 form a RAD branch corresponding to a RAD model.

The multitask neural network model 130 may execute on a computing device that includes the data processing hardware 103 of the user device 102 associated with the user 10 or the multitask neural network model 130 may execute on the data processing hardware 113 of the remote system 111. When executing on the data processing hardware 113 of the remote system 111, the user device 102 may send, via the network 104, audio data 120 corresponding to an utterance 119 captured by the user device 102 to the multitask neural network model 130 executing on the remote system 111. In some implementations, components of the multitask neural network model 130 are distributed for execution across the data processing hardware 103 of the user device 102 and the data processing hardware 113 of the remote system 111. For instance, the audio encoder 150 may execute on one of the user device 102 or the remote system 111 while the SID, SSD, and RAD heads 154, 160, 161 execute on the other one of the user device 102 or the remote system 111. Such an arrangement may be beneficial when processing/storage/memory resources are limited on the user device 102. The multitask neural network model 130 may employ all three of the SID, SSD, RAD heads 154, 160, 161 or any combination of the two of the heads. For instance, the multitask neural network model 130 may employ the SID head 154 and the SSD head 160 but not the RAD head 161.

In some implementations, the audio encoder 150 includes a multi-head attention model architecture. For instance, the audio encoder 150 may include a stack of Conformer blocks. The multi-head attention model architecture of the audio encoder 150 does not have to be limited to Conformer blocks and may include any type of multi-head attention model architecture including, without limitation, a stack of transformer blocks or lightweight convolution blocks.

Figure 2:
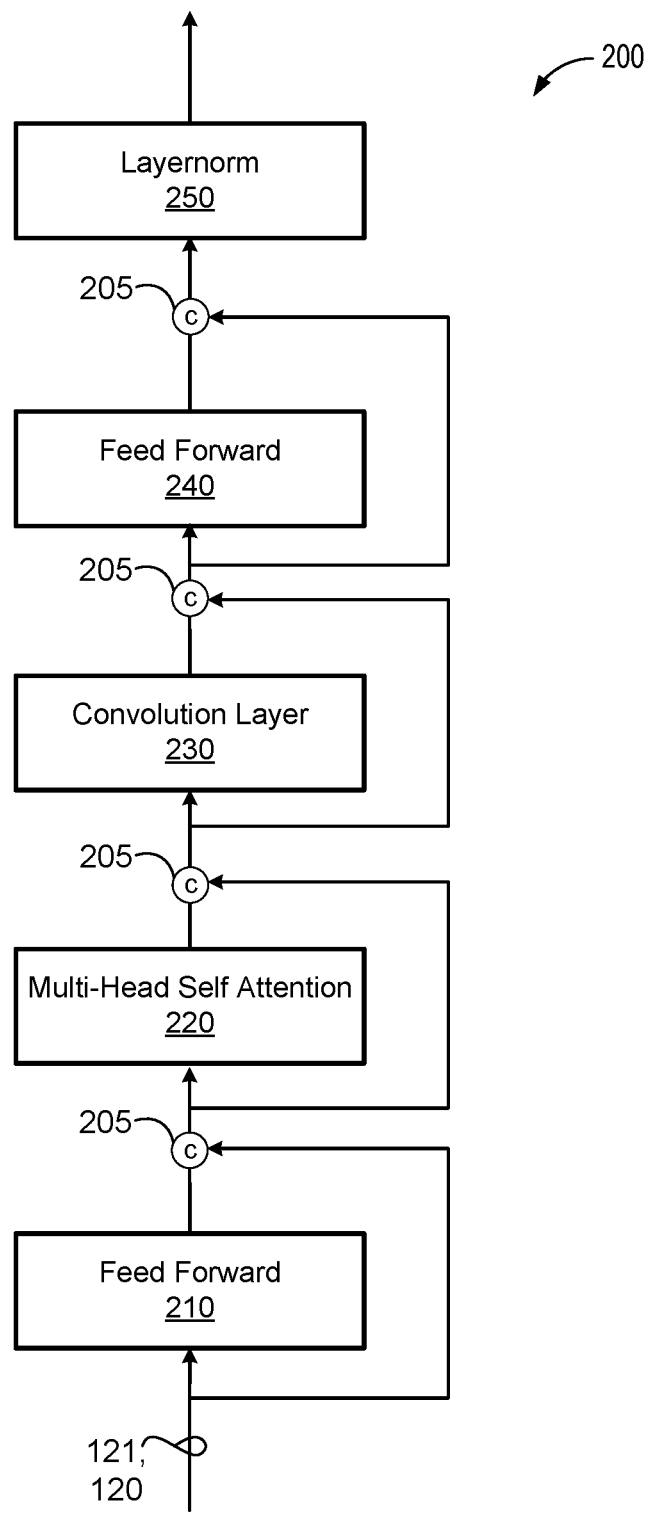
FIG. 2 is a schematic view of an example of a Conformer block that may form a stack of Conformer layers implemented by an encoder of the speaker identification and synthetic speech detection system.

FIG. 2 provides an example of a Conformer block 200 from the stack of Conformer layers of the encoder 150. The Conformer block 200 includes a first half feed-forward layer 210, a second half feed-forward layer 240, with a multi-head self attention block 220 and a convolution layer 230 disposed between the first and second half feed-forward layers 210, 240, and concatenation operators 205. The first half feed-forward layer 210 processes audio features 121 extracted from the input audio data 120. For instance, an acoustic front-end (not shown) may extract audio features 121 from the input audio data 120 for input to audio encoder. The audio features 121 may include Log-Mel filterbanks computed and stacked every four (4) frames with a stride of three (3). Subsequently, the multi-head self attention block 220 receives the input audio data 120 concatenated with the output of the first half-feed forward layer 210. Notably, the multi-head self attention block 220 integrates a relative sinusoidal positional encoding scheme to allow the self attention block 220 to generalize better on different input length such that the resulting encoder 150 is more robust to variance of the length of the input audio data 120 characterizing an utterance 119. Intuitively, the role of the multi-head self attention block 220 is to summarize acoustic context separately for each input frame that is to be encoded. A convolution layer 230 subsamples the output of the multi-head self attention block 220 concatenated with the output of the first half feed forward layer 210. Thereafter, a second half-feed forward layer 240 receives a concatenation of the convolution layer 230 output and the multi-head self attention block 220. A layer norm module 250 processes the output from the second half feed-forward layer 240. Mathematically, the conformer block 200 transforms input features x, using modulation features m, to produce output features y, as follows:

$$\hat{x} = x + r(m) \odot x + h(m) \quad (1)$$
$$\tilde{x} = \hat{x} + \frac{1}{2}FFN(\hat{x}), \tilde{n} = n + \frac{1}{2}FFN(n)$$
$$x' = \tilde{x} + Conv(\tilde{x}), n' = \tilde{n} + Conv(\tilde{n})$$
$$x'' = x' + MHCA(x', n')$$
$$x''' = x' \odot r(x'') + h(x'')$$
$$x'''' = x' + MHCA(x', x''')$$
$$y = LayerNorm\left(x'''' + \frac{1}{2}FFN(x'''')\right)$$

Referring back to FIG. 1, in some examples, the multitask neural network model 130 is deployed in a multi-user, speech-enabled environment in which multiple different users 10 are each enrolled with the user device 102 and have permission to access a respective set of personal resources (e.g., calendar, music player, email, messaging, contact list, etc.) associated with that user. Enrolled users 10 are restricted from accessing personal resources from the respective sets of personal resources associated with the other enrolled users. Each enrolled user 10 may have a respective user profile that links to the respective set of personal resources associated with that user, as well as other pertinent information (e.g., user-specified preference settings) associated with that user 10.

The audio encoder 150 and the SID head 154 may be initially trained on the SID task to determine a respective evaluation speaker embedding/vector 155 for the utterance 119 that conveys voice characteristics of the user 10. The reference speaker embedding/vector 155 represents the voice characteristics of the utterance 119 captured by the user device 102. Thereafter, a verifier 170 may compare the speaker embedding 155 to one or more reference speaker embeddings 171 associated with enrolled/authorized users that have permission to access a respective set of personal resources (e.g., calendar, music player, email, messaging, contact list, etc.) associated with that user. The evaluation and reference speaker embedding/vectors 155 may include d-vectors or i-vectors. When the speaker embedding/vector 155 matches one of the reference speaker embeddings 171, the verifier 170 may verify the identity of the user 10 that spoke the utterance 119 as one of the enrolled/authorized users. Advantageously, SID/ASV allows the user 10, among other things, to unlock and access the user device 102 by speaking the utterance without requiring the user to manually enter (e.g., via typing) or speak a passcode or provide some other means of verification (e.g., answer a challenge question, provide biometric verification data, etc.) to gain access to the user device 102. Likewise, in the multi-user, speech enabled environment, the SID/ASV performed by the audio encoder 150, SID head 154, and verifier 170 may be used to determine which enrolled user 10 is speaking the utterance 119. For instance, in FIG. 1, John may be an enrolled user 10 of the user device 102 (or an interface for a digital assistant 101 running on the user device), and the digital assistant 101 needs to discern whether John spoke the utterance 119 "Ok Google, Play my music playlist" in order to access a music player and ultimately audibly output tracks from the appropriate music playlist associated with John.

The audio encoder 150 initially trained on the SID task may be used to subsequently train the SSD head 160 on the SSD task to determine whether the input audio data 120 characterizing the utterance 119 includes synthetic speech. For instance, the utterance 119 captured by the user device 102 in the streaming audio 118 may correspond to synthetic speech generated by a text-to-speech (TTS) system 11 or a voice conversion (VC) model 13. Here, the TTS system 11 may convert input text corresponding to the utterance 119 into synthetic speech that has voice characteristics of an authorized/enrolled user 10 who has permission to access the user device 102. Likewise, the VC model 13 may receive audio of the utterance 119 spoken by an imposter user who is not authorized to aces the user device 102 and convert the audio into converted audio that has the voice characteristics of the authorized/enrolled user 10. As such, an imposter user/entity may employ the TTS system 11 and/or the VC model 13 to produce synthetic speech having voice characteristics of the authorized/enrolled user to spoof the SID head 154 into generating a speaker embedding for the authorized/enrolled user 10 to gain unauthorized access to the user device 102 and/or set of personal resources associated with the authorized/enrolled user 10. As a countermeasure to prevent spoofing of the verifier 170, the SSD head 160 of the multitask neural network model 130 is configured to receive, as input, the audio encodings 152 generated as output by the audio encoder 150 and generate, as output, a SSD classification score 162 indicating whether or not the audio data 120 characterizing the utterance 119 includes human-generated bona fide speech or synthetic/spoofed speech. In some examples, the SSD classification score 162 includes a probability score indicating the presence of synthesized speech when the probability score 162 satisfies a SSD threshold score. In these examples, a spoofed speech detector 172 may compare the probability score conveyed by the SSD classification score 162 to the SSD threshold score to determine an output indicating whether the utterance 119 is bona fide speech or synthetic/spoofed speech. In other examples, the SSD classification score 162 includes a binary/Boolean value indicating the presence of human-generated bona fide speech when the value is equal to "0" or synthesized speech when the value is equal to "1", or vice versa.

Similar to the SSD head 160, the audio encoder 150 initially trained on the SID task may be used to subsequently train the RAD head 161 on the RAD task to determine whether the input audio data 120 characterizing the utterance 119 includes prerecorded speech played back from an audio output device. As mentioned previously, an enrolled user's prerecorded voice may be played back from an audio output device and a microphone of the user device 102 may capture the played back audio of the enrolled user's prerecorded voice. Thereafter, the SID head 154 may extract an evaluation vector 155 that the verifier 170 verifies as a match to a reference vector 171 for the enrolled user, thereby spoofing the verifier 170 into permitting the imposter to gain unauthorized access to the user device. As a countermeasure to prevent spoofing of the verifier 170, the RAD head 161 of the multitask neural network model 130 is configured to receive, as input, the audio encodings 152 generated as output by the audio encoder 150 and generate, as output, a RAD classification score 163 indicating whether or not the audio data 120 characterizing the utterance 119 includes bona fide speech, associated with non-recorded speech audibly spoken by a human, or spoofed speech, associated with prerecorded speech played back from the audio output device. In some examples, the RAD classification score 163 includes a probability score indicating the presence of prerecorded speech when the probability score 163 satisfies a RAD threshold score. In these examples, the spoofed speech detector 172 may compare the probability score conveyed by the RAD classification score 163 to the RAD threshold score to determine an output indicating whether the utterance 119 is bona fide speech or prerecorded/spoofed speech. In other examples, the RAD classification score 163 includes a binary/Boolean value indicating the presence of non-recorded human-generated bona fide speech when the value is equal to "0" or pre-recorded speech when the value is equal to "1", or vice versa.

In some implementations, the multitask neural network model 130 is configured to restrict access to the one or more resources when at least one of verifier 170 determines that the evaluation speaker embedding 155 does not match any reference speaker embeddings 171 associated with enrolled users authorized to access the resources or the spoofed speech detector 172 determines the SSD classification score 162 and/or the RAD classification score 163 includes synthetic and/or prerecorded speech. In these implementations, the multitask neural network model 130 will prevent the ASr system 180 from performing speech recognition on the audio data 120 or otherwise suppress speech recognition performed on the audio data 120 to the extent that the ASR system 180 already initiated performing speech recognition.

In some additional implementations, the multitask neural network model 130 is configured to authorize access to one or more resources when the verifier 170 determines the evaluation speaker embedding 155 matches the reference speaker embedding 171 associated with the enrolled user authorized to access the resources and the spoofed speech detector 172 determines the SSD classification score 162 and/or the RAD classification score 163 includes human-generated bona fide speech. In these implementations, the verifier 170 and the spoofed speech detector 172 may collectively output a confirmation 175, that when received by the ASR system 180, causes the ASR system 180 to perform speech recognition on the audio data 120 characterizing the utterance 119. To the extent that the ASR system 180 already commenced performance of speech recognition, the confirmation 175 may cause the ASR system 180 to continue processing the audio data 120 to recognize the terms spoken by the user 10 in the utterance 119.

The ASR system 180 may include an ASR model that is configured to perform speech recognition on the audio data 120 that characterizes the query, e.g., "Play my music playlist". The ASR system 180 may also include a natural language understanding (NLU) module configured to perform query interpretation on the speech recognition result output by the ASR model. Generally, the NLU module may perform semantic analysis on the speech recognition result to identify the action to perform that is specified by the query. In the example shown, the NLU module may determine that performance of the action specified by the query "Play my music playlist," requires access to a respective set of personal resources associated with a respective enrolled user 10 of the user device 102. Thus, the NLU module determines that the action specified by the query is missing a necessary parameter, i.e., the identity of the user, needed to perform the action. Accordingly, the NLU module may use the identity of a particular enrolled user (e.g., John) 10 verified by the verifier 170 to ascertain which resources to access to perform the action, and therefore initiate fulfillment of the query by providing an output instruction 185 to perform the action specified by the query. In the example shown, the output instruction 185 may instruct a music streaming service to stream a music track from the enrolled user John's music playlist. The digital assistant 101 may provide a response to the query that includes the music track for audible output from the user device 102 and/or one or more other devices in communication with the user device 102.

FIGS. 3A and 3B show an example training process 300 for training the multitask neural network model 130 to perform both speaker identification (SID) and synthetic speech detection (SSD) tasks concurrently without the need of employing separate neural network models for performing the SID and SSD tasks. The training process 300 may execute on the remote system 111 of FIG. 1. The training process 300 includes a first training stage 300a (FIG. 3A) where an untrained audio encoder 150 and the SID head 154 overlain on top of the untrained audio encoder 150 are trained on the SID task to learn how to predict speaker embeddings/representations 155 from input audio. After the first training stage 300a is complete, and the audio encoder 150 and the SID head 154 are fully trained to perform SID tasks (e.g., automatic speaker verification), the training process 300 includes a second training stage 300b (FIG. 3B) that uses the audio encoder 150 trained on the SID task by the first training stage 300a to train the SSD head 160 to learn how to predict whether input audio corresponds to human-generated bona fide speech or synthetic/synthesized speech.

Referring to FIG. 3A, the first training stage 300a (i.e., a SID training stage) obtains one or more SID training data sets 310 stored in data storage 301 and trains the untrained audio encoder 150 and SID head 154 on the training data sets 310. Once trained by the first training stage 300a, the audio encoder 150 and the SID head 154 may collectively form a SID model 151. The data storage 301 may reside on the memory hardware 115 of the remote system 111. Each training data set 310 includes a plurality of training utterances 320, 320a-n spoken by M different speakers to allow the training data set 310 to include multiple different speaker negative training utterances 320 in a given training batch. Moreover, each training data set 310 may include N utterances 320 per speaker among the M different speakers to allow the training data set 310 to also include same speaker positive training utterances 320 in the given training batch. Each corresponding training utterance 320 may include a text-dependent portion 321 and/or a text-independent portion 322. The text-dependent portion 321 includes an audio segment characterizing a predetermined word (e.g., "Hey Google") or a variant of the predetermined hotword (e.g., "Ok Google") spoken in the training utterance 320. In additional implementations, the text-dependent portion 321 in some training utterances 320 includes audio segments characterizing other terms/phrases lieu of the predetermined word or variant thereof, such as custom hotwords, verification phrases (e.g., "This is Meg"), or commonly used voice commands (e.g., play, pause, volume up/down, call, message, navigate/directions to, etc.). The text-dependent portion 321 is optional such that only a portion of the training utterances 320 may include the text-dependent portion or none of the training utterances 320 may include the text-dependent portion 321.

In some examples, the text-independent portion 322 in each training utterance 320 includes an audio segment that characterizes a query statement spoken in the training utterance 320 following the predetermined word characterized by the text-dependent portion 321. For instance, the corresponding training utterance 320 may include "Ok Google, What is the weather outside?" whereby the text-dependent portion 321 characterizes the predetermined "Ok Google" and the text-independent portion 322 characterizes the query statement "What is the weather outside". While the text-dependent portions 321 in each training utterance 320 is phonetically constrained by the same predetermined word or variation thereof, the lexicon of the query statement characterized by each text-independent portion 322 is not constrained such that the duration and phonemes associated with each query statement is variable.

With continued reference to FIG. 3A, the first stage 300a of the training process 300 trains the untrained audio encoder 150 on the training utterances 320, 320a-n to generate, as output from the audio encoder 150, audio encodings 152 for the training utterances 320. That is, the audio encoder 150 is configured to encode audio data characterizing the training utterances into hidden feature representation (e.g., a series of encodings/vectors 152). The SID head 154 receives, as input, the audio encodings 152 output from the audio encoder 150 and generates, as output, a respective speaker embedding 155 for each utterance 320. In some examples, the speaker embedding 155 output by the SID head 154 for each utterance includes a d-vector. However, the first training stage 300a may train the audio encoder 150 and SID head 154 on the SID task to generate other types of speaker embeddings 155 as well, such as i-vectors. During training, additional information about each utterance 320 may be provided as input to the SID model 151 composed of the audio encoder 150 and the SID head 154 overlain on top of the audio encoder 150. For instance, SID targets 324, such as SID target vectors/speaker embeddings, corresponding to ground-truth output labels for training the SID model 151 to learn how to predict the speaker embedding 155 for the particular speaker may be provided as input to the neural network during training with the utterances 320. Thus, one or more utterances 320 from each particular speaker may be paired with a particular SID target vector 324.

As aforementioned, the audio encoder 150 includes a multi-head attention model architecture that may incorporate a stack of Conformer blocks. Optionally, other types of multi-head attention model architectures may be employed by the audio encoder 150 such as, without limitation, Transformer blocks or lightweight convolutional blocks in lieu of Conformer blocks. The SID head 154 stacked/overlain on top of the audio encoder 150 may include one or more fully-connected network layers designated to learn to generate speaker-related information specific to the speaker embedding 155.

Training the untrained audio encoder 150 and the SID head 154 may begin by providing a sequence of training utterances 320 and using a pair-wise training technique in which first and second training utterances 320 each paired with a particular SID target vector 324 are input to the audio encoder 150 and corresponding audio encodings 152 generated by the audio encoder 150 are processed by the SID head 154 to generate a respective speaker embedding 155 for each of the first and second training utterances 320. An SID loss module 156 may then compares the respective speaker embeddings 155 to determine whether or not the two speaker embeddings 155 were derived from training utterances 320 that were uttered by the same speaker. That is, the SID loss module 156 may compute an SID loss 158 indicating a likelihood that the two speaker embeddings 155 match one another. The SID loss 158 output from the SID loss module 156 provides an indication of whether the training utterances first and second training utterances 320 were spoken by the same speaker. In one example, the SID loss 158 may simply include a binary value of '0' or a '1' in which the '0' indicates the utterance were spoken by different speakers and the '1' indicates the utterances were spoken by the same speaker. The parameters of the audio encoder 150 and the SID head 154 may then be adjusted based on the SID loss 158. Multiple sets of pair-wise training utterances 320 may be processed in this manner.

Referring to FIG. 3B, the second training stage 300b (i.e., a SSD training stage) receives/obtains the SID model 151 trained by the first training stage 300a and uses the trained audio encoder 150 to train the SSD head 160 to learn how to predict whether input audio corresponds to human-generated bona fide speech or synthetic/synthesized speech. During the second training stage 300b, parameters/weights of the trained audio encoder 150 are frozen and the SSD head 160 is trained (or fine-tuned) to learn how to project SSD classification scores 162 indicating whether or not input audio includes human-generated bona fide speech or synthetic speech. As will become apparent, the SSD head 160 receives, as input, audio encodings 152 generated by the trained audio encoder 150 for SSD training utterances 330 and generates, as output, a respective SSD classification score 162 for each SSD training utterance 330. In some examples, the SSD classification score includes a probability score 162 indicating the presence of synthesized speech when the probability score 162 satisfies a SSD threshold. In other examples, the SSD classification score includes a binary/Boolean value indicating the presence of human-generated bona fide speech when the value is equal to "0" or synthesized speech when the value is equal to "1", or vice versa.

As with the SID head 154 employed by the SID model 151, the SSD head 160 stacked/overlain on top of the trained audio encoder 150 may include one or more fully-connected network layers. However, by contrast to the fully-connected network layers employed by the SID head 154, the fully-connected network layers of the SSD head 160 are trained/designated to learn to project SSD classification scores 162. In some examples, the second training stage 300b trains the one or more fully-connected network layers of the SSD head 160 from scratch using the SSD training utterances 330. In other examples, the one or more fully-connected network layers of the SSD head 160 include the same fully-connected network layers of the SID head 154 trained by the first training stage 300a and the second training stage 300b fine-tunes the one or more fully-connected network layers on the SSD training utterances 330 for use by the SSD head 160 to learn how to project the speaker embeddings 155 into SSD classification scores 162. Notably, regardless of whether the SSD head 160 is fine-tuned or trained from scratch during the second training stage 300b, the parameters/weights of the trained audio encoder 150 remain frozen while training the SSD head 160 on the SSD task using the SSD training utterances 330.

The second training stage 300b receives receives/obtains a plurality of SSD training utterances 330 stored in the data storage 301 and uses the trained audio encoder 150 for training the SSD head 160 on the SSD training utterances 330. Once trained by the second training stage 300b, the audio encoder 150 and the SSD head 160 may collectively form a SSD model 153. The data storage 301 may reside on the memory hardware 115 of the remote system 111. The SSD training utterances 330 may include a set of human-originated speech samples 330a and a set of synthetic speech samples 330b. In some examples, the number of speech samples in the set of human-originated speech samples 330a is greater than the number of speech samples in the set of synthetic speech samples 330b. In other examples, the number of speech samples in the set of human-originated speech samples 330a is less than the number of speech samples in the set of synthetic speech samples 330b. Each human-originated speech sample 330a corresponds to an utterance of non-synthetic speech spoken by a real/human whereas each synthetic speech sample 330b corresponds to synthetic/synthesized speech generated by a machine. That is, one or more of the synthetic speech samples 330b may include synthesized speech generated by a text-to-speech (TTS) system from corresponding input text. Additionally or alternatively, one or more of the synthetic speech samples 330b may include synthesized speech generated by a voice conversion model from a corresponding input utterance having different voice characteristics than the generated synthesized speech.

In some implementations, the second training stage 300b trains the SSD head 160 using supervised learning where each SSD training utterance 330 is paired with a corresponding ground-truth target 165 indicating whether the SSD training utterance 330 includes a human-generated speech sample 330a or a synthetic speech sample 330b. Here, a SSD loss module 168 may apply a loss function on the classification score 162 predicted by the SSD head 160 to generate a corresponding SSD loss 169 based on the ground-truth target 165. In some examples, the loss function includes a softmax cross-entropy loss where a softmax layer applies a softmax on the classification score 162 (e.g., the Boolean values) output from the SSD head 160 that is fed to the cross-entropy loss function to generate the SSD loss 169.

In other implementations, the second training stage 300b trains the SSD head 160 using self-supervised learning (also referred to as "unsupervised learning") where labels are naturally part of the training utterances 330 and do not include separate external ground-truth labels, i.e., each human-generated speech sample 330a does not include a separate external ground-truth label indicating that the sample includes bona fide speech and each synthetic speech sample 330b does not include a separate external ground-truth label indicating that the sample includes synthesized speech. Here, the human-generated speech samples 330a may correspond to positive training samples and the synthetic speech samples 330b may correspond to negative training samples where the SSD model 153 learns to look for patterns without pre-existing annotated labels and with minimal human supervision.

A third training stage may similarly train the RAD head 161 using the trained audio encoder 150 trained during the first training stage 300a of FIG. 3A. The third training stage will train the RAD head 161 to learn how to predict whether input audio corresponds to non-prerecorded, human-generated bona fide speech or prerecorded speech played back from an audio output device. As with the second training stage 300b, parameters/weights of the trained audio encoder 150 are frozen and the RAD head 161 is trained (or fine-tuned) to learn how to project RAD classification scores 163 indicating whether or not input audio includes bona fide speech or spoofed/prerecorded speech. The RAD classification scores 163 may include probability distributions indicating a likelihood of the audio data including prerecorded speech or may include Boolean/binary values indicating the presence of non-prerecorded, human-generated bona fide speech when the value is equal to "0" or prerecorded speech when the value is equal to "1", or vice versa.

In some examples, the SSD head 160 is also trained to detect the presence of prerecorded speech in input audio, thereby alleviating the need for a separate RAD head 161. As such, the SSD head 160 may be trained to output a classification score that indicates the input audio including bona fide speech or spoofed speech when either one of synthetic speech or pre-recorded speech is detected.

Figure 4:
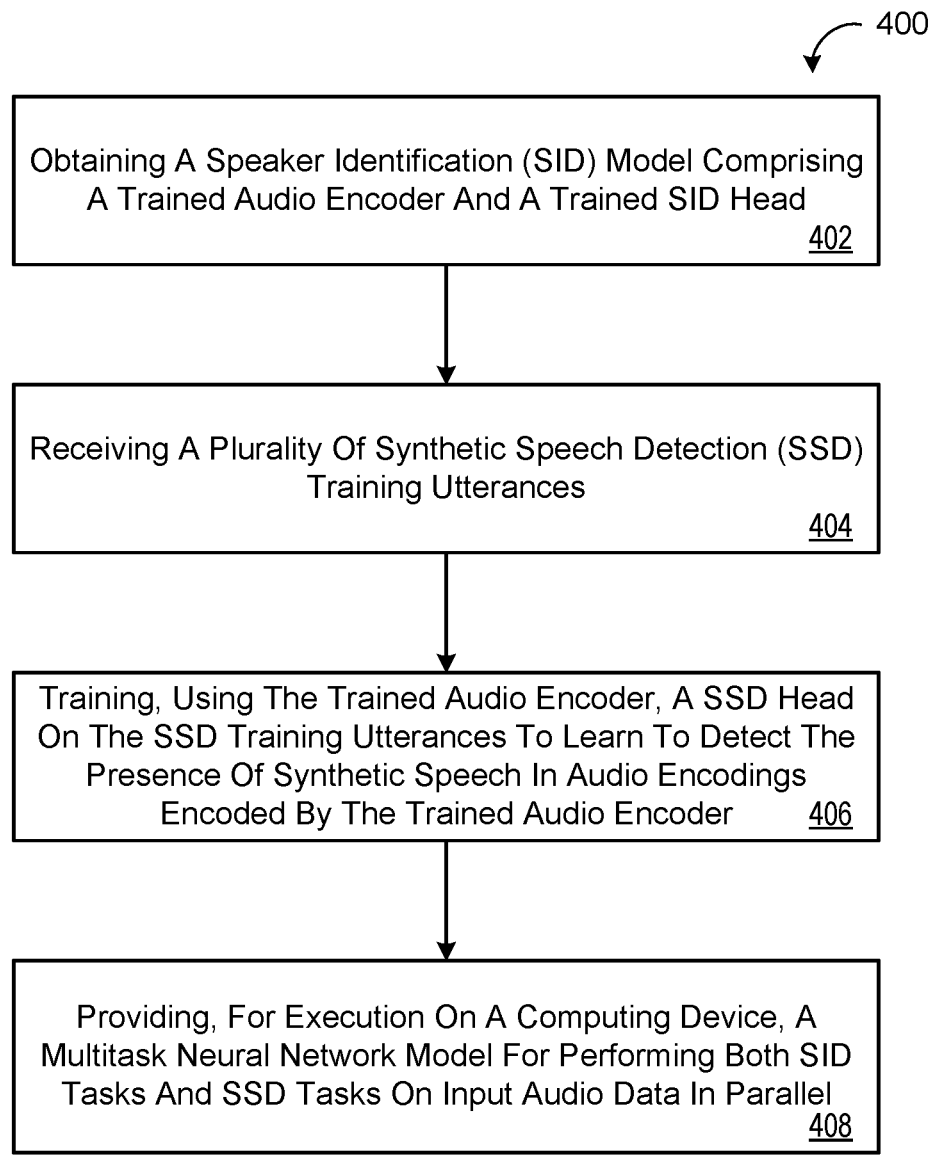
FIG. 4 is a flowchart of an example arrangement of operations for a method of training a multitask neural network model for performing both SID and SSD tasks on input audio data in parallel.

FIG. 4 provides an example flowchart of an example arrangement of operations for a method 400 of training a multitask neural network model 130 for performing both SID and SSD tasks on input audio data in parallel. The method 400 may execute on the data processing hardware 113 of the remote system 111 and/or on the data processing hardware 103 of the user device 102. At operation 402, the method includes obtaining a speaker identification (SID) model 151 trained to predict speaker embeddings 155 from utterances spoken by different speakers. The SID model 151 includes a trained audio encoder 150 and a trained SID head 154. The trained audio encoder 150 may include a multi-head attention model architecture. For instance, the multi-head attention model architecture may incorporate a stack of Conformer blocks 200. In other configurations, the multi-head attention model architecture may incorporate a stack of Transformer blocks or a stack of lightweight convolutional blocks.

The obtained SID model 151 may be trained on a plurality of SID training data sets 320 that each including a plurality of SID training utterances spoken by M different speakers. Here, one or more of the SID training utterances spoken by a particular speaker may be paired with a corresponding target speaker embedding 324 for training the audio encoder 150 and the SID head 154 to learn how to predict a corresponding speaker embedding 155 for the particular speaker. Additionally or alternatively, the plurality of SID training utterances of one or more of the SID training sets 320 may include N utterances spoken per speaker among the M different speakers. Moreover, the plurality of SID training utterances in each SID training set 320 may include human-originated non-synthetic speech.

At operation 404, the method 400 includes receiving a plurality of SSD training utterances 330. Here, the SSD training utterances 330 comprising a set of human-originated speech samples 330a and a set of synthetic speech samples 330b. In some examples, the number of speech samples in the set of human-originated speech samples 330a is greater than the number of speech samples in the set of synthetic speech samples 330b.

At operation 406, the method 400 includes training, using the trained audio encoder 150, a SSD head 160 on the SSD training utterances 330 to learn to detect the presence of synthetic speech in audio encodings 152 encoded by the trained audio encoder 150. Here, the SSD head 160 is overlain on the trained audio encoder 150.

At operation 408, the method 400 includes providing, for execution on a computing device 102, 111, the multitask neural network model 130 for performing both SID tasks and SSD tasks on input audio data 120 in parallel. The multitask neural network model 130 includes the trained audio encoder 150, the trained SID head 154 overlain on the trained audio encoder 150, and the trained SSD head 160 overlain on the trained audio encoder 150.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 5:
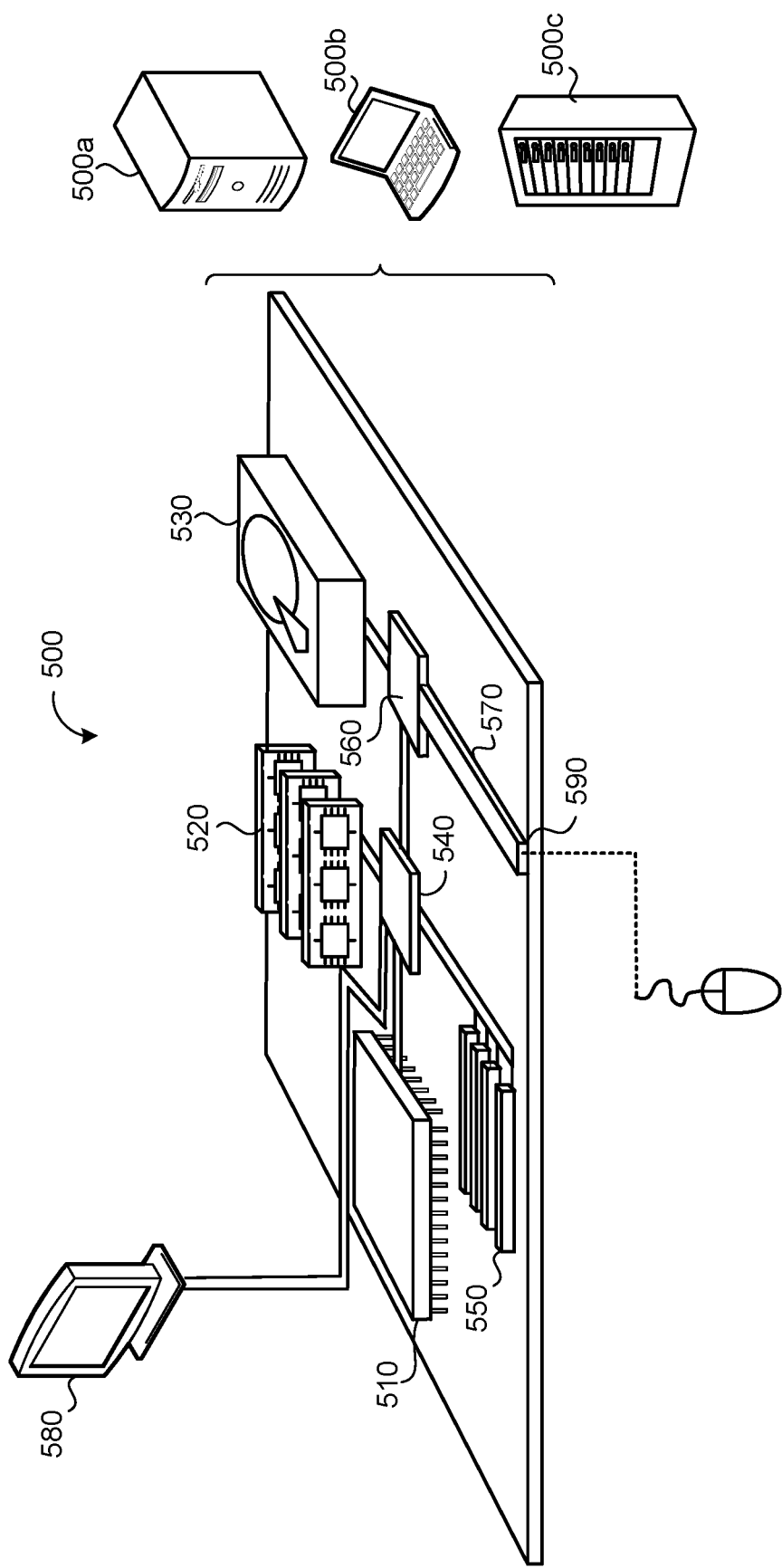
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 (i.e., memory hardware) and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor (i.e., data processing hardware) 510 can process instructions stored on the memory hardware (i.e., the memory 520) for execution within the computing device 500, including instructions stored in the memory 520 or on the storage device 530 to display graphical information for a graphical user interface (GUI) on an external input/output device, such as display 580 coupled to high speed interface 540. The data processing hardware 510 and memory hardware 520 may include the data processing hardware 113 and the memory hardware 115 of the remote system, the data processing hardware 103 and the memory hardware 115 of the AED 102, or a combination thereof. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving a plurality of speaker identification (SID) training data sets, each SID training data set comprising a plurality of SID training utterances spoken by different speakers;
   during a first training stage, training a SID model to predict speaker embeddings from the SID training utterances spoken by the different speakers, the trained SID model comprising a trained audio encoder and a trained SID head;
   receiving a plurality of synthetic speech detection (SSD) training utterances, the plurality of SSD training utterances comprising a set of human-originated speech samples and a set of synthetic speech samples, each synthetic speech sample in the set of synthetic speech samples converted from a corresponding textual utterance by a text to speech (TTS) system;
   during a second training stage after training the SID model, training, using the trained audio encoder, a SSD head on the SSD training utterances to learn to detect the presence of synthetic speech in audio encodings encoded by the trained audio encoder, wherein:
      parameters/weights of the trained audio encoder are frozen while training the SSD head on the SSD training utterances; and
      the SSD head is overlain on the trained audio encoder; and
   providing, for execution on a computing device, a multitask neural network model for performing both SID tasks and SSD tasks on input audio data in parallel, the multi-task neural network model comprising the trained audio encoder, the trained SID head overlain on the trained audio encoder, and the trained SSD head overlain on the trained audio encoder.

2. The method of claim 1, wherein each SID training data set comprising the plurality of SID training utterances are spoken by M different speakers.

3. The method of claim 2, wherein one or more of the SID training utterances spoken by a particular speaker are paired with a corresponding target speaker embedding for training the audio encoder and the SID head to learn how to predict a corresponding speaker embedding for the particular speaker.

4. The method of claim 2, wherein the plurality of SID training utterances of one or more of the SID training sets comprises N utterances spoken per speaker among the M different speakers.

5. The method of claim 2, wherein the plurality of SID training utterances of each SID training data set comprise human-generated non-synthetic speech.

6. The method of claim 1, wherein the number of speech samples in the set of human-originated speech samples is greater than the number of speech samples in the set of synthetic speech samples.

7. The method of claim 1, wherein the multitask neural network model is configured to perform the SID tasks and the SSD tasks on the input audio data in parallel by:
receiving, as input to the trained audio encoder, the input audio data, the input audio data characterizing an utterance captured by an array of one or more microphones;
generating, as output from the trained audio encoder, shared audio encodings that encodes the input audio data;
providing, as input to the trained SID head and the SSD head, the shared audio encodings generated as output from the trained audio encoder;
generating, as output from the trained SID head, an evaluation speaker embedding representing characteristics of a voice of the utterance characterized by the input audio data; and
generating, as output from the trained SSD head, a SSD classification score indicating whether the utterance characterized by the input audio data comprises human-generated bona fide speech or synthetic speech.

8. The method of claim 7, wherein the multitask neural network model is configured to authorize access to one or more resources when:
the evaluation speaker embedding matches a reference speaker embedding associated with an enrolled user authorized to access the resources; and
the SSD classification score generated as output from the trained SSD head indicates the utterance characterized by the input audio data comprises human-generated bona fide speech.

9. The method of claim 7, wherein the multitask neural network model is configured to restrict access to one or more resources when at least one of:
the evaluation speaker embedding does not match any reference speaker embeddings associated with enrolled users authorized to access the resources; or
the SSD classification score generated as output from the trained SSD head indicates the utterance characterized by the input audio data comprises synthetic speech.

10. The method of claim 1, wherein the SSD training utterances are different than the plurality of SID training utterances in each SID training data set.

11. The method of claim 1, wherein the audio encoder comprises a multi-head attention model architecture.

12. The method of claim 11, wherein the multi-head attention model architecture incorporates a stack of Conformer blocks.

13. The method of claim 1, wherein the SSD head comprises one or more fully-connected layers.

14. A system comprising:
data processing hardware; and
memory hardware in communication with the data processing hardware, the memory hardware storing instructions that when executed on the data processing hardware cause the data processing hardware to perform operations comprising:
receiving a plurality of speaker identification (SID) training data sets, each SID training data set comprising a plurality of SID training utterances spoken by different speakers;
during a first training stage, training a SID model to predict speaker embeddings from the SID training utterances spoken by the different speakers, the trained SID model comprising a trained audio encoder and a trained SID head;
receiving a plurality of synthetic speech detection (SSD) training utterances, the plurality of SSD training utterances comprising a set of human-originated speech samples and a set of synthetic speech samples, each synthetic speech sample in the set of synthetic speech samples converted from a corresponding textual utterance by a text to speech (TTS) system;
during a second training stage after training the SID model, training, using the trained audio encoder, a SSD head on the SSD training utterances to learn to detect the presence of synthetic speech in audio encodings encoded by the trained audio encoder, wherein:
parameters/weights of the trained audio encoder are frozen while training the SSD head on the SSD training utterances; and
the SSD head is overlain on the trained audio encoder; and
providing, for execution on a computing device, a multitask neural network model for performing both SID tasks and SSD tasks on input audio data in parallel, the multi-task neural network model comprising the trained audio encoder, the trained SID head overlain on the trained audio encoder, and the trained SSD head overlain on the trained audio encoder.

15. The system of claim 14, wherein each SID training data set comprising the plurality of SID training utterances are spoken by M different speakers.

16. The system of claim 15, wherein one or more of the SID training utterances spoken by a particular speaker are paired with a corresponding target speaker embedding for training the audio encoder and the SID head to learn how to predict a corresponding speaker embedding for the particular speaker.

17. The system of claim 15, wherein the plurality of SID training utterances of one or more of the SID training sets comprises N utterances spoken per speaker among the M different speakers.

18. The system of claim 15, wherein the plurality of SID training utterances of each SID training data set comprise human-generated non-synthetic speech.

19. The system of claim 14, wherein the number of speech samples in the set of human-originated speech samples is greater than the number of speech samples in the set of synthetic speech samples.

20. The system of claim 14, wherein the multitask neural network model is configured to perform the SID tasks and the SSD tasks on the input audio data in parallel by:
receiving, as input to the trained audio encoder, the input audio data, the input audio data characterizing an utterance captured by an array of one or more microphones;
generating, as output from the trained audio encoder, shared audio encodings that encode the input audio data;
providing, as input to the trained SID head and the SSD head, the shared audio encodings generated as output from the trained audio encoder;
generating, as output from the trained SID head, an evaluation speaker embedding representing characteristics of a voice of the utterance characterized by the input audio data; and generating, as output from the trained SSD head, a SSD classification score indicating whether the utterance characterized by the input audio data comprises human-generated bona fide speech or synthetic speech.

21. The system of claim 20, wherein the multitask neural network model is configured to authorize access to one or more resources when:
the evaluation speaker embedding matches a reference speaker embedding associated with an enrolled user authorized to access the resources; and
the SSD classification score generated as output from the trained SSD head indicates the utterance characterized by the input audio data comprises human-generated bona fide speech.

22. The system of claim 20, wherein the multitask neural network model is configured to restrict access to one or more resources when at least one of:
the evaluation speaker embedding does not match any reference speaker embeddings associated with enrolled users authorized to access the resources; or
the SSD classification score generated as output from the trained SSD head indicates the utterance characterized by the input audio data comprises synthetic speech.

23. The system of claim 14, wherein the SSD training utterances are different than the plurality of SID training utterances in each SID training data set.

24. The system of claim 14, wherein the audio encoder comprises a multi-head attention model architecture.

25. The system of claim 14, wherein the multi-head attention model architecture incorporates a stack of Conformer blocks.

26. The system of claim 14, wherein the SSD head comprises one or more fully-connected layers.

* * * * *